United States Patent
Metzler et al.

(10) Patent No.: US 9,482,524 B2
(45) Date of Patent: Nov. 1, 2016

(54) MEASURING SYSTEM FOR DETERMINING 3D COORDINATES OF AN OBJECT SURFACE

(75) Inventors: Bernhard Metzler, Dornbirn (AT); Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 14/002,657

(22) PCT Filed: Apr. 13, 2012

(86) PCT No.: PCT/EP2012/056759
§ 371 (c)(1),
(2), (4) Date: Aug. 30, 2013

(87) PCT Pub. No.: WO2012/140190
PCT Pub. Date: Oct. 18, 2012

(65) Prior Publication Data
US 2014/0046589 A1 Feb. 13, 2014

(30) Foreign Application Priority Data
Apr. 14, 2011 (EP) .................................. 11162508

(51) Int. Cl.
*G01B 21/04* (2006.01)
*G05D 1/00* (2006.01)

(52) U.S. Cl.
CPC .............. *G01B 21/04* (2013.01); *G05D 1/0094* (2013.01); *B64C 2201/123* (2013.01); *B64C 2201/141* (2013.01)

(58) Field of Classification Search
CPC ...... G01B 21/04; G05D 1/00; G05D 1/0094; B64C 2201/123; B64C 2201/141
See application file for complete search history.

(56) References Cited

U.S. PATENT DOCUMENTS 5,802,201 A * 9/1998 Nayar .................... B25J 9/1697
                                                382/106
5,838,562 A * 11/1998 Gudat ................ B60K 31/0008
                                                180/167

(Continued)

FOREIGN PATENT DOCUMENTS

CN       1529806 A       9/2004
CN       1630806 A       6/2005

(Continued)

OTHER PUBLICATIONS

European Search Report dated Aug. 29, 2011 as received in Application No. EP 11 16 2508.

*Primary Examiner* — Jean-Paul Cass
(74) *Attorney, Agent, or Firm* — Maschoff Brennan

(57) ABSTRACT

A measuring system for determining 3D coordinates of measurement points on an object surface which has a scanning apparatus for measuring the measurement points on the object surface and for determining inner measurement point coordinates in an inner scanning coordinate system. Furthermore, a referencing arrangement for producing referencing information for referencing the inner measurement point coordinates in the outer object coordinate system and an evaluation unit for determining the 3D coordinates of the measurement points in the outer object coordinate system on the basis of the inner measurement point coordinates and the referencing information are provided such that the inner measurement point coordinates are in the form of 3D coordinates in the outer object coordinate system. The scanning apparatus is in this case carried in an unmanned, controllable, automotive air vehicle.

19 Claims, 5 Drawing Sheets

(56) References Cited

U.S. PATENT DOCUMENTS

| | | | | |
|---|---|---|---|---|
| 5,902,177 A * | 5/1999 | Tessier | ............... | A22C 17/0046 452/156 |
| 6,043,452 A * | 3/2000 | Bestenlehrer | ...... | B23K 26/0075 219/121.62 |
| 6,792,684 B1 * | 9/2004 | Hyyppa | ............... | G01B 11/00 33/1 A |
| 6,965,843 B2 | 11/2005 | Raab et al. | | |
| 7,310,889 B2 * | 12/2007 | Stamenkovic | ............ | G01S 5/14 33/503 |
| 7,773,204 B1 * | 8/2010 | Nelson | ............... | G01S 13/48 356/5.02 |
| 8,036,452 B2 | 10/2011 | Pettersson et al. | | |
| 8,255,184 B2 | 8/2012 | Chang et al. | | |
| 8,256,480 B1 * | 9/2012 | Weber | ............... | B25J 15/0019 156/359 |
| 8,577,535 B2 * | 11/2013 | Cummings | ......... | G06F 3/04815 701/2 |
| 8,605,998 B2 * | 12/2013 | Samples | ............ | G06K 9/00201 382/104 |
| 8,761,961 B2 * | 6/2014 | Lee | ............... | G05D 1/0016 244/175 |
| 8,781,790 B2 * | 7/2014 | Zhu | ............... | G01S 7/4802 342/95 |
| 2002/0092350 A1 * | 7/2002 | Etkin | ............... | G01V 7/16 73/382 G |
| 2002/0165648 A1 * | 11/2002 | Zeitler | ............... | G05D 1/0261 701/23 |
| 2003/0191561 A1 * | 10/2003 | Vos | ............... | G05B 9/02 701/3 |
| 2004/0174537 A1 | 9/2004 | Ferger | | |
| 2005/0004723 A1 * | 1/2005 | Duggan | ............... | G05D 1/0061 701/24 |
| 2006/0162175 A1 * | 7/2006 | Stamenkovic | ............ | G01S 5/14 33/503 |
| 2006/0215179 A1 | 9/2006 | McMurtry et al. | | |
| 2007/0222968 A1 * | 9/2007 | Krasutsky | ............... | F41G 7/008 356/4.01 |
| 2008/0077284 A1 * | 3/2008 | Swope | ............... | G05D 1/101 701/5 |
| 2009/0073034 A1 * | 3/2009 | Lin | ............... | G01S 19/49 342/357.32 |
| 2009/0125163 A1 * | 5/2009 | Duggan | ............... | G05D 1/0061 701/2 |
| 2010/0157056 A1 * | 6/2010 | Zohar | ............... | G01S 3/7864 348/144 |
| 2010/0274387 A1 * | 10/2010 | Pitzer | ............... | G06N 7/005 700/246 |
| 2010/0305752 A1 * | 12/2010 | Abramson | ............... | G01S 1/70 700/245 |
| 2011/0122257 A1 * | 5/2011 | Kirk | ............... | G01C 11/06 348/187 |
| 2011/0246015 A1 * | 10/2011 | Cummings | ......... | G06F 3/04815 701/23 |
| 2011/0313722 A1 * | 12/2011 | Zhu | ............... | G01S 7/4802 702/159 |
| 2013/0146703 A1 * | 6/2013 | Pecnik | ............... | B64B 1/06 244/30 |

FOREIGN PATENT DOCUMENTS

| | | |
|---|---|---|
| CN | 1666084 A | 9/2005 |
| CN | 101871775 A | 10/2010 |
| DE | 196 33 686 A1 | 2/1998 |
| DE | 197 42 335 A1 | 4/1999 |
| DE | 100 48 097 A1 | 4/2002 |
| DE | 101 27 304 A1 | 12/2002 |
| DE | 102 46 781 A1 | 4/2004 |
| DE | 10 2008 036 710 A1 | 2/2010 |
| EP | 0 754 930 A2 | 1/1997 |
| EP | 1066497 B1 | 1/2001 |
| EP | 1 621 458 A2 | 2/2006 |
| EP | 2 023 077 A1 | 2/2009 |
| EP | 2075096 A1 | 7/2009 |
| EP | 2400261 A1 | 12/2011 |
| GB | 2499159 A * | 8/2013 |
| WO | 99/63299 A1 | 12/1999 |
| WO | 2006/097408 A1 | 9/2006 |
| WO | 2008/046663 A2 | 4/2008 |
| WO | 2008/138507 A1 | 11/2008 |
| WO | 2012/049438 A1 | 4/2012 |

* cited by examiner

MEASURING SYSTEM FOR DETERMINING 3D COORDINATES OF AN OBJECT SURFACE

FIELD OF THE INVENTION

The invention relates to a measuring system for three-dimensional measurement of an object, in particular an industrial product, a method for determining 3D coordinates, and an unmanned, controllable, automotive air vehicle for use in a system.

BACKGROUND

Systems for measurement of surfaces of objects are e.g. used in industry in production processes for checking component and product geometries. This enables design tolerances of objects to be checked and production-related manufacturing defects to be rapidly identified and parts whose dimensions lie outside a predefined standard to be removed from the process. An improvement of a production quota with a simultaneous reduction of the production errors of parts can result from the use of a measuring system of this type.

In an industrial manufacturing process e.g. measuring systems with tactile sensors can be used. Said systems mainly comprise a movable, guided measuring tip with a ruby ball attached to its end, wherein when there is contact of the ruby ball with the object surface a measurement point is detected and the coordinates of the point can be determined. By scanning defined object positions or by retraction from parts of the surface the shape and dimensions of the object can be recorded, compared with target values determined in advance for this purpose and any deviations from the target values can be determined.

The tactile measurement of objects can be disadvantageous for very large objects, e.g. aircraft, because such a measuring process is very time intensive on the one hand and because of the size of the object can only be carried out with difficulty on the other hand. The increasing requirements for substantially complete quality control during a running production process and for the digitization of the shape of objects, in particular of prototypes, make the recording of surface topographies—in relation to determining coordinates of individual points of the surface of the objects to be measured in a short time—an ever more frequently posed measuring task.

To reduce the measuring time for this purpose an optical measurement sensor can be used for contactless measurement. Such an optical surface measuring system can in general comprise a measuring system employing image sequences to determine 3D coordinates or an optical scanner, e.g. a line scanner, with which the surface is scanned line by line, wherein the measuring system or the scanner is simultaneously guided over the surface.

A scanner that is known from the prior art can record the distances to a plurality of points in a short time depending on the respective scanning angle. By taking into account the movement of the scanner relative to the surface a scatter plot can be generated therefrom, which represents the surface of the object to be measured. By using image processing a measured surface can also be graphically processed, represented on a display and an indication of any measurement deviations occurring can be merged into the graphic.

Furthermore, measuring systems using image sequences to determine 3D coordinates of measurement objects that are known from the prior art, which e.g. can be in the form of portable, hand-held and/or permanently installed systems, comprise in general a pattern projector for illuminating the measurement object with a pattern and are thus sometimes referred to as pattern-projecting 3D scanners or light structure 3D scanners. The pattern projected onto the surface of the measurement object is recorded by a camera system as a further component of the measuring system.

During a measurement the projector illuminates the measurement object time sequentially with different patterns (e.g. parallel light and dark strips of different widths, in particular a rotation of the strip pattern can also occur, e.g. by 90°). The camera(s) record(s) the projected strip pattern at a known perspective to the projection. An image is recorded for each projection pattern with each camera. For each image point of all cameras there is thus a time sequence of different brightness values.

Other suitable patterns can also be projected besides strips, however, such as e.g. random patterns, pseudocodes, etc. Suitable patterns for this purpose are sufficiently known to the person skilled in the art from the prior art.

Pseudocodes enable e.g. an easier absolute association of object points, which is increasingly difficult for the projection of very fine strips. For this purpose initially one or more pseudocodes and then a fine strip pattern can be projected in a rapid sequence or even in successive recordings different strip patterns that become finer during the sequence can be projected, until the desired accuracy is achieved in the resolution of measurement points on the measurement object surface.

The 3D coordinates of the measurement object surface can then be calculated from the recorded image sequence using image processing according to a method known to those skilled in the art in this area of photogrammetry and/or strip projection. For example, such measurement methods and measuring systems are disclosed in WO 2008/046663, DE 101 27 304 A1, DE 196 33 686 A1 or DE 10 2008 036 710 A1.

A problem with carrying out a measurement with a measuring system with a camera or scanner often arises with manual, i.e. hand-held, measurements. Because in principle very high computing powers are necessary in order to record and to process a scatter plot of a surface in three-dimensions, in particular if recorded images or scan lines are to be merged because of a movement of the measuring system, the movement tolerance is usually significantly limited in relation to speed and vibration. A substantial steadiness of the measuring system when measuring is thereby mandatory and if not maintained is a major cause of generated measurement errors.

One approach to taking such measurement errors into account when detecting the surface—even when using a robot arm to guide the measurement sensor—and thus to compensate for vibrations or speed changes during the measurement is e.g. disclosed in the European patent application with the application number 10166672.5.

When recording image sequences, e.g. translational and/or rotational accelerations of the measurement sensor or the measurement object can be measured and the measured accelerations can be taken into account when determining the 3D coordinates of the object. Determining the 3D coordinates of measurement points can take place depending on the measured accelerations. Thus errors caused by unsteady guidance of the measuring system can be taken into account in a computer and as a result correct position data can be determined.

An alternative proposal for making a contactless 3D surface measurement using a recording unit able to be carried out accurately and rapidly is presented in EP 2 023 077. A measuring device coupled to a measuring head can determine a measurement position and orientation of the measuring head for a measurement carried out with the head, wherein the measuring head can be guided to a surface or guided along the same using an articulated arm. By a second measurement of an at least partly overlapping surface section, a surface image can be generated in a common coordinate system from the position information that can be obtained in this way.

A common disadvantage with the above-mentioned embodiments is that with a large object to be measured, because of the limited range of an articulated arm and the anatomically restricted range and mobility of a person guiding the measuring system, the achievement of all relevant measurement positions at the object can only be carried out with difficulty or can be partly not achieved. Furthermore, an object measurement can e.g. only be carried out in a toxic environment by a person in special protective equipment and thus in turn under difficult conditions on the one hand or, on the other hand, the measurement can no longer be carried out e.g. if tolerable toxicity values are exceeded.

SUMMARY

It is thus an object of the present invention to provide a measuring system with associated units and a corresponding method, with which a surface measurement can be carried out precisely, rapidly and with a high degree of automation, in particular on objects that are at least partly difficult to access.

A special object of the present invention is to provide the capability to make a substantially complete 3D measurement of an object able to be carried out in a user friendly, simple and rapid manner in an environment that is harmful or hostile to humans.

Said objects are achieved by realizing the characterizing features of the independent claims. Features that develop the invention in an alternative or advantageous manner are given in the dependent claims.

The invention provides a measuring system for determining 3D coordinates, in particular a plurality of 3D coordinates, of measurement points of an object surface, in particular of an industrial product, in an outer object coordinate system.

Here the measuring system comprises an optical scanning device based on the triangulation principle, in particular for point by point optical measurement of the measurement points of the object surface and for determining inner measuring point coordinates in an inner scanning coordinate system, a referencing arrangement for generating referencing information, in particular an outer measuring position and measuring orientation of the scanning device, for referencing the inner measurement point coordinates in the outer object coordinate system and an evaluation unit for determining the 3D coordinates of the measurement points in the outer object coordinate system depending on the inner measurement point coordinates and the referencing information, so that the inner measurement point coordinates are present as 3D coordinates in the outer object coordinate system, in particular as a scatter plot. Furthermore, the measuring system comprises an unmanned, controllable, automotive air vehicle and the scanning device is carried by the air vehicle, in particular wherein the air vehicle is designed in such a way that the air vehicle can be oriented and moved while hovering. Furthermore, a control unit is provided that is configured such that the air vehicle, taking into account respective current inner measurement point coordinates determined by the scanning device and/or taking into account an object surface predefined by a digital model, is moved along a flight path defined by the digital model while being automatically controlled relative to the object surface while maintaining a predefined range of measuring distances, in particular a measuring distance.

According to the invention, the control unit can be configured such that the air vehicle can be moved and oriented relative to the object surface under automatic control depending on a measuring position and measuring orientation of the scanning device that can be determined using the referencing arrangement, in particular continuously determined, and/or on a measuring distance to the object surface that can be determined using the scanner.

Furthermore, the scanning device of a measuring system according to the invention can comprise an optical scanning apparatus, wherein scanning strips can be generated during movement of the air vehicle, and/or a measuring system using image sequences for determining the measurement point coordinates, in particular wherein the scanning device can comprise a line scanner, a strip projection scanner and/or a camera.

In this regard, furthermore, the arrangement of a telescope on the air vehicle is conceivable, wherein the telescope can be rotated about a horizontal and a vertical axis and the respective angle of the telescope orientation can be detected. In addition, a distance measurement unit and a camera are integrated in the telescope, enabling the telescope to be oriented on the basis of a recorded image and the distance to or coordinates of a point to be measured to be determined. In said configuration the air vehicle can thus represent a movable, flying total station.

A measuring system of this type according to the invention can enable the measurement of objects such that the positioning of the measuring measurement unit, i.e. of the air vehicle, takes place fully automatically and thus in particular an iterative approach by a user to a specified target point or a surface is not necessary. For this purpose, the air vehicle can be internally controlled or remotely controlled to a defined position, e.g. using radio signals or using signals that are transmitted to the air vehicle by cable, via infrared or via Bluetooth. In addition, power can be supplied to the air vehicle via a cable, which connects the air vehicle to a remote control and/or to the referencing arrangement. E.g. a flying drone can be used as the air vehicle, which can be positioned using targeted control of motorized rotors, wherein the air vehicle is unmanned and can be moved using the provided motors, in particular under remote control.

An air vehicle position for controlling the air vehicle or for generating control signals for controlling can be determined using the measuring system. A referencing arrangement is provided for this purpose. Said arrangement can comprise a total station, a theodolite, a tachymeter or e.g. a GNSS system or a pseudo satellite transmitting position information, so-called pseudolites, wherein in each case a module corresponding with the appropriate arrangement is disposed on the air vehicle. By means of an interaction achievable in this way between a device provided for position determination and a component adapted thereto an air vehicle position can be accurately determined and moreover the position of the air vehicle can be tracked continuously or continually.

In addition to position determination, determining the orientation of the air vehicle can be carried out. Using sensors provided on the flight unit, such as e.g. acceleration sensors, turn rate sensors, a magnetic compass, in particular an IMU (Inertial Measurement Unit), the orientation of the unit can be determined in up to three axes. This enables the yaw, pitch and roll angles to be determined and taken into account during measuring tasks to be carried out by the unit. Alternatively or even in addition to determination using internal sensors, orientation determination can be carried out externally. For this purpose markers, in particular in the form of light emitting diodes, can be attached to the air vehicle in a defined distribution or with a defined relative position with respect to each other and the markers can be recorded by a recording unit, in particular a camera. Using the position of the diodes in a recorded image, a conclusion can be drawn regarding the orientation of the air vehicle.

Regarding the surface topography of the object, a relative position of the air vehicle, e.g. to a normal to the surface, can be determined on the basis of a current determined air vehicle position and/or the air vehicle can be controlled depending on the respective positioning relationship. A target position for the air vehicle can also be derived from said information and said target position can be defined as the target position to be achieved for the air vehicle. Controlling the air vehicle can thus take place in such a way that it can be controlled to the target position and positioned there. Positioning of the air vehicle can thus take place at least temporarily substantially in a positionally fixed manner, i.e. the air vehicle can hold a fixed position without fluctuations independently of external influences over a temporary time interval. This can in particular be achieved by adapted control of the air vehicle. Furthermore, by determining a path of travel or a flight path for the air vehicle, e.g. from a plurality of target positions or a target surface profile of an object surface, the air vehicle can be moved along the path, in particular wherein the movement takes place in a smooth manner, i.e. without fluctuations of the airspeed, i.e. substantially without changes in speed.

Determining the position of the air vehicle or a deviation from a specified position can take place continuously by means of the position determining arrangement that is in contact with the air vehicle. A transmitting unit associated with the position determining arrangement can provide positioning signals for this purpose, which can be received by a receiver at the target unit. If this arrangement comprises e.g. a GNSS transmitter or if a GNSS system is used to accurately determine the position of the air vehicle, then the air vehicle can comprise a GNSS receiver, with which position information can be received and from which a position can be determined. A GNSS system in use for this can e.g. be in the form of GPS or GLONASS. Accordingly, a GNSS antenna can be disposed on the air vehicle in order to be able to receive the signals associated with the respective system. In addition thereto, a GNSS reference station can be provided, which is likewise designed to receive GNSS signals and in addition to provide reference data or correction data, e.g. for one of the known DGPS or RTK or VRS methods for boosting the accuracy of position determination. An air vehicle adapted for such a reference system can thus additionally be designed to receive correction signals and to carry out a geodetic position determination while taking these signals into account.

Should, however, a position determination take place in a closed space, e.g. in a production hall, often no GNSS signal can be received by the air vehicle. In this case positioning can be carried out in the hall using pseudo satellites, so-called pseudolites. The pseudolites can be placed at respective known positions in relation to an outer coordinate system (object coordinate system) and from there can transmit position information, e.g. in a signal format similar to a GNSS signal, using which in turn a position determination can be conducted at the air vehicle. The signals here can imitate a position of an imaginary satellite and thus do not provide a global position determination but enable the determination of a relative position within a coordinate system or an object coordinate system, e.g. representing the production space. If in addition the positions of the pseudolites relative to the global coordinate system are known, then an absolute, global position determination of the air vehicle can also be carried out indirectly. For such an exact position determination, signals from four pseudolites can be received at the air vehicle, in particular wherein with a common time base for the signals the reception of three signals enables accurate position determination.

In particular, the actual position of the air vehicle can be determined by targeting a module disposed on the air vehicle, e.g. a reflector, by a measuring device, e.g. a total station or a laser tracker. Here the position of the measuring device e.g. can already be known by a calibration process having been carried out at the measuring device and the device could thus determine its own position by measuring known points. If a reflector on the air vehicle is now targeted by said measuring station, the direction to the air vehicle can be determined by determining the orientation of an emitted measurement beam and a distance to the air vehicle can be determined using a distance measurement carried out using the measurement beam. The relative position of the air vehicle to the measuring device can be determined definitely and exactly from said variables and with knowledge of the position of the measuring device an absolute, in particular geodetically accurate, position of the air vehicle can be derived. Controlling the air vehicle can be carried out based on the position of the air vehicle (actual position) determined in this way, in particular continuously determined. For this purpose control data can be derived from the position information and the air vehicle can be flown to a defined target position using said control data.

The target position or the path of motion or the flight path for the air vehicle can especially be determined from the coordinates or position information of an object surface. If this represents e.g. a wing of an air vehicle, a path parallel to the surface profile of the wing can be defined as the path of motion that can be flown by the air vehicle equipped as a measuring unit. To facilitate maintaining accurate movement of the air vehicle, a tolerance range about the path can be defined here, wherein the path is considered to be achieved once the air vehicle or the component giving the position of the air vehicle lies within the tolerance range. In addition, for hovering flight a path can be defined that is e.g. between one and one hundred centimeters, in particular between five and 20 centimeters, at a distance from and parallel to the wing surface or to a tangent or tangential surface to the surface or at a determined angle thereto, in particular within a defined angular range. Here likewise a target or tolerance range, which has a defined positioning tolerance about the path of motion or the flight path, can be spanned, wherein the target position or the flight path is considered to be achieved if the air vehicle or on the other hand the component of the air vehicle that gives its current position, is within the target region. In particular, because of external influences on the air vehicle, e.g. by changes in the air flow, temperature changes and/or variable pressure conditions, this can often not be kept hovering for an unlimited time at a fixed position or on the defined flight path, a definition of a suitable target region can be advantageous for positioning and movement. However, the air vehicle can maintain a position that can vary within a previously defined target region using a compensating countermeasure against an external acting deflection force.

In the definition of a particular flight path for the air vehicle, a respective achievable orientation of the air vehicle is additionally included or the path can be selected such that the orientation of the air vehicle can take place in a defined direction at each position of the path. Thus in addition to a determined positioning or movement of the air vehicle, its orientation can be defined and thereby an absolute measuring direction and—depending on the requirement—an associated measuring distance can be specified for measurements to be carried out with the air vehicle.

For such measuring processes the air vehicle can carry e.g. a scanner, e.g. a line scanner, or can carry an alternative measuring system using image sequence for the purpose of determining 3D coordinates of measurement objects. Using such a device a surface structure can be recorded point by point, i.e. at a defined resolution, with a scanning process proceeding line by line with a triangulation scanner, e.g. at between one and 50 points per millimeter, in particular also with one or more points repeated at time intervals. Furthermore, a 3D surface structure can be derived by detecting an at least partly coinciding object surface region from two different perspectives, in particular wherein additional patterns are projected on the partial region. For this purpose a measuring system can comprise e.g. a diode for projecting the pattern and two cameras disposed relative to each other in a defined manner.

The point-resolved 3D surface information recorded in this way is normally represented by a method known from the prior art using a scatter plot. The point coordinates of said scatter plot are determined here in relation to a coordinate system assigned to the measuring system. In addition, by means of the previously described capabilities for position and orientation determination of the air vehicle, wherein three rotational and three translational degrees of freedom of the air vehicle can be determined, the point coordinates can be transferred to a higher level coordinate system (object coordinate system) and thus a scatter plot representing the object or the object surface or parts thereof can be generated.

Moreover, controlling the air vehicle can take place based on known object data and by distance measurements to the object (using the scanner) and by determining the orientation of the air vehicle. Thus a flight path can be determined, in particular automatically, along which the air vehicle can move. Here e.g. a required lateral measuring accuracy and thus a maximum permissible speed of movement or a minimum necessary overlap of scanning strips, e.g. an overlap of 20% of a strip with an adjacent or following strip, and/or an advantageous range of distances to the surface in order to achieve a defined distance measurement accuracy can be taken into account. The scanning strips arise during movement of the scanner or of a scanning device in the form of a scanner relative to the object surface, wherein the direction of motion here can essentially lie perpendicular to the scanning direction of the scanner. For control purposes, constant compensation of the measuring position of the scanner, a distance measurement of the scanner or a distance measurement in the scanner alignment to the surface is carried out and the orientation of the air vehicle is determined.

Furthermore, a CAD model of the object can be known for measurement of a surface and can be used to control the air vehicle. In addition, the position of the air vehicle can be determined by targeting a reflector on the air vehicle with a laser tracker and the orientation can be determined by recording a marker provided by light emitting diodes on the air vehicle using a camera disposed on the laser tracker. For initializing the measurement and for calibration of the laser tracker in an object coordinate system, e.g. three defined points on the object, whose coordinates are known from the CAD model, can now be measured using the laser tracker. Furthermore, a flight path for an unmanned, (remotely) controlled, in particular autonomous, air vehicle embodying the measuring unit can be calculated from the CAD-model and optimized regarding certain measurement criteria, such as e.g. measuring accuracy, measuring period, flight stability, maintaining a line of sight between air vehicle and laser tracker and/or for collision avoidance. Furthermore, the air vehicle can be moved to a starting position and positioned there by means of control signals at the laser tracker. On reaching the starting position a triangulation scanner disposed on the air vehicle can be activated and the measurement of the object can be started by moving the air vehicle along the defined path of motion at a predefined measuring distance during scanning by the scanner, and thus a scatter plot corresponding to the swept measurement surface is built up.

Analogously to said measuring process, the air vehicle can be simultaneously targeted for position determination, in particular with increased accuracy, by a plurality of laser trackers that are in contact with each other, whereby in addition an increase of the operating radius of the air vehicle can be achieved. Alternatively or additionally, the position determination can take place in the air vehicle using signals provided by pseudolites that can be received in the air vehicle, wherein determining the orientation of the air vehicle, in particular by the sensors of a sensor unit, also takes place at the air vehicle (internally).

In the context of a measuring system according to the invention, the position and/or a target profile of the object surface can be predefined, in particular can be specified using a digital model, in particular a CAD model, in particular wherein based on the predefined object surface respective target surface coordinates can be compared with the respective 3D coordinates and in particular wherein the referencing arrangement can be referenced by referencing predefined reference points to the object surface.

In addition, the control unit can be configured such that the air vehicle can be moved along a flight path, wherein the flight path can be determined, in particular automatically, depending on the surface position and the surface profile.

Using said information e.g. quality control of objects and manufacturing products can be carried out. Digitized and dimensioned object illustrations, e.g. represented by a CAD model of the object, can be placed (stored) in the measuring system for this purpose and used as a starting point for object measurement. According to the object position and the shape and extent of the surface of the object, a flight path for an unmanned air vehicle, which is to be used for measurement, can be automatically calculated and specified and the air vehicle can be moved along said path. By continuous scanning of the object surface during the movement of the air vehicle, a scatter plot can be produced with the measured surface points, in particular with their coordinates in the respective coordinate system. This enables measured actual values to be derived for the scanned surface, which e.g. give the dimensions of the object, its shape and/or radii and angle of the surface. Said values can be compared with predetermined target values for the surface in the CAD model and thus any deviations from the target can be determined. Using such a control process, in particular faulty components can be rapidly identified or error-free production or production within a tolerance range can be confirmed.

Moreover monitoring, i.e. continuous measurement, of objects by the air vehicle or the scanning device on the air vehicle can take place. The air vehicle can be moved on a specified path for this purpose and said path can be flown repeatedly. Measurement of an object is carried out at the same time and object coordinates are recorded. Here the surface can be measured on the one hand using a scanner and can be recorded as images on the other hand using a camera. Said coordinates can be continuously compared with defined target coordinates and thus a shape or a variation of the shape of the object surface can be determined. This enables production processes to be tracked and assessed at the same time. For example, when applying a coat of paint to a product a surface geometry can be determined before and after the application and conclusions drawn regarding the thickness of the paint coat and as a result regarding the extra weight of the product. Said monitoring can thus likewise be used for the purpose of quality control. In addition, geological deformations can be identified and tracked using this principle.

Moreover, in a measuring system according to the invention the flight path and/or a flight speed can be optimized with respect to a scanning travel, a scanning time, a scanning accuracy, the stability of motion of the air vehicle, position and orientation determination of the air vehicle and/or collision avoidance, in particular wherein a distance to an object, especially to an obstruction, can be determined using distance measuring sensors.

Furthermore, within the framework of the invention the scanning strips can be at least partly overlapped depending on the flight path, whereby the scanning accuracy, the scanning travel and the scanning time can be adjusted and/or whereby the movement and orientation of the air vehicle and/or the scanning device can be determined and/or adjusted using an analysis of an overlapping region of the scanning strips, in particular by image processing. Moreover, according to the invention the respective surface coordinates can be compared with the respective 3D coordinates based on the predefined object surface.

Depending on the required measuring accuracy an adaptation of the path of motion can take place such that e.g. individual scanning strips overlap in a ratio that can be defined thereby, and thus on the one hand a measuring resolution can be increased in these areas and on the other hand an orientation or an alignment correction of the air vehicle can take place.

Said orientation can thus be determined and controlled by seeking coincident patterns in the surface structure in the overlapping areas and adapting the direction of motion or the orientation of the air vehicle, in particular the orientation of the scanning device, using the coincidences. Such a comparison of scanning regions can take place here in particular using image processing. In addition, by a reduction of the movement of the air vehicle relative to the object and with constant resolution of the scanning device, in particular wherein scanning with a scanning device takes place essentially perpendicular to the direction of motion of the air vehicle, an increase of the point resolution in the generated scatter plot can be achieved. In contrast thereto, with likewise constant scanning resolution and an increase in speed the point resolution can be lower, but the time required for the measurement can reduce at the same time.

In addition, a variation of the measuring distance from the air vehicle or from the scanning device or the scanning device to the object surface can affect the accuracy and also the time required for the measurement. The measuring distance can e.g. lie between one and 50 centimeters, in particular between five and 20 cm.

For small distances the accuracy of measurement can be increased by this and a scanning area covered by the scanner or the width of a scanning strip can simultaneously be reduced. As a result the measuring period of the measuring process can increase (for a given speed of the air vehicle relative to the object), because a large number of scanning strips has to be created for the required measurement of the object.

Optimization of the path of motion can in addition be carried out with respect to the stability of motion or of flight. In particular, this type of path optimization can take place to avoid smaller flight radii to be dealt with by the air vehicle and a "circular" movement to be achieved thereby, in particular for changes of direction, i.e. a movement of the air vehicle substantially without compensating movements and/or severe or long-duration deceleration and acceleration phases of the unit.

Moreover, the movement optimization can take place to ensure an essentially continuous line of sight between the external referencing arrangement and the air vehicle, so that the referencing or the position determination and determining the orientation of the air vehicle take place continuously and the air vehicle can be reliably controlled. In addition, e.g. a collision with obstructions such as robots or movable machine parts can be avoided by the optimization of the path of motion. Such obstructions can, moreover, be taken into account in the stored CAD model and/or identified by additional sensors provided in the air vehicle, e.g. radar sensors.

Within the framework of the invention, the referencing arrangement can comprise a position determining arrangement, which is designed such that the external measuring position of the scanning device in relation to the object coordinate system can be determined, and/or an orientation determination arrangement, which is designed such that a measuring orientation of the scanning device can be determined in relation to the object coordinate system.

Furthermore, according to the invention the measuring position and the measuring orientation of the scanning device can be determined using a known position relationship and orientation relationship of the air vehicle and the scanning device, in particular wherein an air vehicle position and an air vehicle orientation can be determined by the referencing arrangement.

With the determination of the referencing information, the current orientation and the current position of the scanning unit can be determined, wherein such a determination can take place with a respective referencing arrangement—position determination arrangement and/or orientation determination arrangement. For example, the scanning device can be targeted for position determination, in particular with a laser beam, and simultaneously the orientation of the device can be visually recorded, in particular with a video camera. From the image of the scanning device recorded in this way its orientation can be derived using image processing and identification by the scanning device. For determining the measuring orientation and the measuring position of the scanning device, said device does not have to be directly referenced, but alternatively or additionally referencing of the air vehicle can take place according to the principle described above, wherein a relationship of the air vehicle position and the air vehicle orientation to the measuring position and the measuring orientation is known and the orientation and position of the scanning device can be determined indirectly using said relationship.

For referencing in a measuring system according to the invention, the scanning device and/or the air vehicle can comprise a reflector and the referencing arrangement can comprise a geodetic measuring device, in particular a total station or a laser tracker. The geodetic measuring device can thereby comprise a radiation source for generating an optical measurement beam for distance measurement, a base defining a vertical axis and a beam deflection unit for emission of the measurement beam and for reception of at least part of the measurement beam reflected at the reflector, wherein for orientation of an optical target axis the beam deflection unit can be pivoted by motor relative to the base about the vertical axis and a tilt axis essentially orthogonal to the vertical axis. In addition, angle measurement functionality can be provided for high precision detection of the orientation of the target axis and an evaluation means can be provided for data storage and for controlling the orientation of the beam deflection unit. The optical measuring beam can also be oriented to the reflector, in particular continuously, so that the measuring position of the scanning device and/or an air vehicle position can be determined.

In connection with a total station this can comprise in particular a targeting device, in particular a targeting telescope, wherein a support can be pivoted by motor relative to a base of the measuring device and the targeting device can be pivoted relative to the support to change the orientation of the targeting device and the targeting device comprises at least one emission unit defining an optical targeting axis and a radiation source for emitting an optical measurement beam for distance measurement parallel, in particular coaxial, to the optical target axis.

Regarding the design of laser trackers or laser scanners, the radiation source can be provided e.g. in a support, which is implemented so as to be pivotable relative to the base about a vertical axis defined through the base, or can be provided in the base, wherein the emitted radiation can be fed to a targeting unit using optical beam guiding elements. In this regard the targeting unit can e.g. be designed as a beam deflecting element (e.g. a mirror).

In particular, a signal that can be transmitted to the scanning device and/or to the air vehicle can contain position information, wherein the position information can be converted in a first processing unit associated with the air vehicle into control data for controlling the air vehicle, or can contain the control data for controlling the air vehicle, wherein the control data can be determined from the position information using a second processing unit associated with the referencing arrangement.

Alternatively or even additionally, the referencing arrangement can comprise at least one GNSS satellite, in particular represented by GPS, GLONASS or Galileo, wherein the GNSS satellite provides GNSS signals, and the scanning device and/or the air vehicle comprise(s) a receiver unit, in particular a GNSS antenna, so that the GNSS signals can be received and the measuring position of the scanning device can be determined from the received GNSS signals.

In particular, according to the invention the referencing arrangement can comprise a pseudo satellite module for transmitting positioning signals and the receiver unit of the scanning device and/or of the air vehicle are designed such that the positioning signals can be received and the measuring position and/or the measuring orientation of the scanning device can be determined from the received positioning signals.

In order to be able to carry out the transfer of coordinates, which have been measured locally with the scanning device on the measurement object surface, into a higher level coordinate system, the scanning device can be referenced in relation to said coordinate system, i.e. a respective position and orientation of the scanning device are combined with the respective measured points.

For this purpose e.g. a measuring system (laser tracker) or a GNSS system or a pseudo satellite system can be used as a referencing arrangement, wherein a module disposed on the air vehicle interacts with a system that is external thereto or wherein a pattern applied to the air vehicle is used for passive determination.

For a measuring arrangement in a referencing arrangement, which e.g. can be embodied by a laser tracker or a total station, the air vehicle and/or the scanning device can be equipped with a reflector or a module that reflects a measuring beam, wherein the reflector can reflect a measuring beam back towards a beam source. The measuring system can thereby comprise a targeting device, wherein the device can be automatically oriented in two axes in a motorized manner and thus a laser beam associated with the targeting unit can be precisely oriented towards the reflector. In addition, the system can comprise sensors for measurement of the orientation angle. In said configuration, when targeting the reflector the position of the air vehicle and/or scanning device relative to the laser tracker can be positively determined. Furthermore, the laser tracker can be calibrated by measuring defined reference points on an object to be measured in an object coordinate system and this enables a measuring position of the scanning device relative to the object to be derived. For controlling the air vehicle, said position information and any orientation information can be transmitted to the air vehicle or to the scanning device. On the one hand this can be in the form of known information, wherein said information can be converted into control data in the air vehicle or in the scanner, on the other hand control data can already be generated from said information in the measuring station and transmitted to the air vehicle and/or the scanner for control purposes.

Referencing or determination of the measuring position can also be achieved using GNSS data or using signals transmitted in a hall of pseudo satellites. For this purpose, the air vehicle or the scanner can comprise suitable receiving means and can determine its own position from the received signals representing position information.

Analogously to transmitting and receiving signals similar to GNSS signals from pseudo satellites, transmitting UWB signals (Ultra Wideband signals) by suitable Ultra Wideband transmitters and receiving at the air vehicle by a matching receiver can take place. From a plurality of received signals, in particular at least three such signals, from different transmitters, in turn position determination of the air vehicle can be carried out. For this purpose, e.g. trilateration can be carried out using the signals and known positions of the transmitters.

Within the framework of the invention, the referencing arrangement can comprise a sensor unit associated with the scanning device and/or the air vehicle for determining the measuring orientation and/or the measuring position of the scanning device, in particular an inclination sensor, a magnetometer, an acceleration sensor, a turn rate sensor and/or a speed sensor. Furthermore, the scanning device and/or the air vehicle can comprise the marker giving the measuring orientation, in particular a defined pattern, a pseudo-random pattern, a barcode and/or a light emitting diode, and the referencing arrangement can comprise a recording unit, in particular a camera, for recording the marker and for determining the measuring orientation of the scanner from the position and arrangement of the marker. With such a design of the referencing arrangement, referencing can take place with respect to the orientation of the scanning device or of the air vehicle or the measuring orientation. The orientation can thus be determined using the internal sensor and/or recorded and derived by video camera and by image processing of an image of the scanning device or of the air vehicle recorded with the camera—depending on the position and arrangement of a marker provided for orientation determination. The sensor unit for determining the orientation can thereby comprise a so-called IMU (Inertial Measurement Unit) with three acceleration sensors, three turn rate sensors in combination with a 3-axis magnetometer. For orientation determination of the air vehicle using the markers on the air vehicle these can be provided in a known arrangement, i.e. placed and oriented relative to each other in a known manner. Said markers or at least some thereof can then be recorded using a camera on the laser tracker. The orientation of the air vehicle can be derived from the relative position and orientation of the markers with respect to each other on the image thereby recorded, in particular using image processing. The markers can be implemented for this purpose e.g. as LEDs (light emitting diodes). From said determination, three rotational degrees of freedom of the air vehicle or of the scanning device can be determined. Together with the position determination, by targeting the reflector with the laser tracker, wherein three translational degrees of freedom can be determined—said three translational degrees of freedom can also be determined by position determination using pseudo satellites—, six degrees of freedom, three translational and three rotational, and an accurate position and orientation of the air vehicle in space can be determined.

In addition, determination of the orientation can be carried out by a method wherein emission of a laser beam takes place in the direction of a detector disposed on the targeting unit, i.e. on the air vehicle or on the scanning device, and a laser beam transmission direction is defined e.g. by the orientation determination arrangement. Determination of a point of incidence of the laser beam on the detector follows. The incident direction of the beam is derived from said point of incidence. Using an association of the incident direction with the emission direction, determining the orientation of the detector relative to the laser source and hence to the targeting unit is now possible. Such a method is e.g. known from WO 2008/138507.

A similar method for orientation determination is disclosed e.g. in WO 2006/097408. The orientation can be determined here using an offset of a receiver relative to a measurement beam axis, which is defined by a measuring beam targeting the receiver, wherein the incident direction is derived from a point of incidence of the measurement beam on the detector or on a partial detection area of the detector.

With another known option for providing information about the orientation of the air vehicle, the position of the air vehicle is tracked and a direction of motion is determined from the position changes. With the assumption that the direction of motion corresponds to a specific orientation of the air vehicle, information about the orientation of the air vehicle can be derived therefrom. The position change can be determined e.g. using a continuous position determination by GPS.

In addition, the position and angular position or orientation of an object in space can take place using an optical measuring device. The measuring device can thereby comprise imaging optics and a detector that is position-resolving in two dimensions. The object or the air vehicle can have a known code pattern, e.g. a barcode or pseudo-random code, and the pattern recorded by the measuring device can be evaluated. Depending on the position of the recorded code, a conclusion can be drawn regarding the respective position of the air vehicle in space. A method corresponding to said principle is e.g. disclosed in EP 1 066 497.

Moreover, for determining the orientation of the air vehicle and/or of the scanning device a plurality of receivers can be disposed on the drone, wherein each receiver can receive signals from a pseudolite. Thus a position in the coordinate system can be determined for any receiver and an orientation of the air vehicle can be determined from a known arrangement and position of the receivers on the air vehicle relative to each other.

The above-mentioned options for determining an orientation can be used in combination with a position determination of the air vehicle for accurate determination of the six degrees of freedom (6-DoF) and hence of the accurate position of the air vehicle in space. A determination of the six degrees of freedom and hence referencing of the orientation and the position of the air vehicle or of the scanning device can additionally take place by the air vehicle and/or the scanner detecting with one or more cameras a defined pattern in an environment, in particular in a working area in a production hall, and the position and orientation of the air vehicle can be derived from the recorded pattern. The pattern can be disposed for this purpose e.g. on walls, ceilings and/or on the ground and be designed as so-called pseudo-random patterns.

Alternatively or additionally, the referencing arrangement can be designed as an optical system, which comprises optical emitters for the respective emission of a pivotable reference plane, in particular a laser plane. In that said emitters provide respective position information through the covered planes, they therefore operate as a type of "optical pseudolites".

For carrying out a position determination, detectors and/or reflectors on the air vehicle and/or the scanner can also be provided, which can detect or reflect the emitted optical radiation and thus enable a position determination. By the use of a plurality of emitters here e.g. the recordable working area can be enlarged or the existence of a visual restriction between the air vehicle and all available emitters can be prevented, and thus the system is of a redundant design.

According to the invention, the referencing arrangement can comprise a distance image recording unit, in particular an RIM camera (Range Imaging), for recording an image of the air vehicle, wherein a contour and/or image point dependent distance data to the air vehicle can be derived from the image and the measuring orientation and/or the measuring position can be determined therefrom. Furthermore, the air vehicle can comprise an environment recording unit, in particular a camera, for recording a position marking disposed in a measurement environment, in particular a defined pattern or a pseudo-random pattern, wherein the determination of the measuring orientation and/or the measuring position can be carried out from a position and orientation of the position marker recorded in an image.

With a distance image recording unit associated with the referencing arrangement the air vehicle can be recorded in a point-resolved manner and a distance value can be assigned to each image point or to each group of image points. This principle of "Range Imaging" can be implemented in a camera, wherein said camera can be oriented towards the air vehicle and thus this can be recorded as an image. From the recorded data e.g. a contour of the air vehicle can then be derived and compared with a known target contour or the recorded contour can be spatially transformed such that an agreement with the target contour is achieved. A conclusion can be drawn regarding the orientation of the air vehicle using a position of the recorded contour relative to the target contour that can be determined therefrom. Moreover, orientation determination can take place according to the above principle using markers attached to the air vehicle. By the recording of distance values, e.g. by means of averaging distance values or by a compensation calculation, the distance between the camera and the air vehicle can also be derived and thus all six degrees of freedom can be determined.

By a reverse procedure, i.e. by recording a marker in the surroundings of the air vehicle using a camera attached to the air vehicle, likewise a position and orientation of the air vehicle can be determined. The position and the markers in the measurement environment can be already known or accurately defined for this. E.g. defined patterns can be recorded with the camera for this purpose and a conclusion can be drawn regarding the measuring orientation and/or the measuring position from their position and size on the recorded image.

The invention further provides a method for determining 3D coordinates, in particular a plurality of 3D coordinates, of measurement points of an object surface, in particular of an industrial product, in an outer object coordinate system. For this purpose are provided spatially offsettable local optical scanning, especially point by point, of the measurement points of the object surface and determination of local measurement point coordinates in an inner scanning coordinate system based on the triangulation principle, generating referencing information, in particular an outer measuring position and measuring orientation, for referencing the local measurement point coordinates in the outer object coordinate system, and determining the 3D coordinates of the measurement points in the outer object coordinate system depending on the local measurement point coordinates and the referencing information, so that the local measurement point coordinates exist as 3D coordinates in the outer object coordinate system, in particular as a scatter plot. Furthermore, a displacement of the scanning by an unmanned, controllable, automotive air vehicle takes place, in particular wherein the air vehicle is oriented and moved while hovering. In addition, according to the invention the air vehicle is moved while being automatically controlled relative to the object surface along a flight path defined by a digital model while taking into account respective current determined inner measurement point coordinates and/or taking into account an object surface predefined by the digital model while maintaining a predefined range of measuring distances, in particular a measuring distance.

With such a method, in particular by a displacement of a scanning position, surface coordinates of objects can be determined fully automatically, wherein recording measurement points of the surface takes place while flying using an air vehicle, in particular with a continuous or continual scanning displacement. However, global object information cannot be obtained with this recording alone, but only respective local measurement points can be scanned or measured. For generating global object information, i.e. of a surface profile in an object coordinate system, such as a scatter plot representing the surface, the respective measured point coordinates must be transferred into a higher level coordinate system and merged. Such a transfer can be achieved in the present case using referencing between the two coordinate systems. As a result a point-resolved object image is obtained, which can be used in particular for quality assurance by comparing the image with target values.

According to the invention, the air vehicle is moved and oriented while being automatically controlled relative to the object surface depending on the especially continually determined external measuring position and eternal measuring orientation and a measuring distance to the object surface. As a result an object surface can be automatically and precisely measured by the air vehicle, the air vehicle being continuously controlled depending on its distance from the surface and the respective orientation and positioning relative to the surface and adapting to the movement of the object surface. The air vehicle can hereby additionally be automatically oriented to the object to be measured.

Within the framework of the method according to the invention, the measurement of the measurement points can take place by optical scanning, in particular with a scanning device, wherein scanning strips are generated, and/or is carried out optically with a measuring system using image sequences for determining the measurement point coordinates. Depending on the requirement on the measuring process, an adaptive measurement on the object can be carried out. The respective measuring method can be selected e.g. depending on a requested point resolution or a measuring speed and the object surface can be measured accordingly. Line scanners or triangulation scanners represent common measuring means here, with which a line by line measurement of the surface can be carried out. A two-dimensional measurement can take place with a simultaneous relative movement of the scanner, in particular perpendicular to the internal scanning direction.

Furthermore, within the framework of the invention a fully autonomous data acquisition by the air vehicle can take place. For this purpose the air vehicle can, after starting a measuring process, automatically explore a measurement environment, which can especially be specified using a definition of a measuring area or measuring volume, and can move within said measurement environment and thereby gather measurement data, i.e. distances to points and coordinates of the points. Thereby the measurement volume can be completely measured in stages and a digital, geometric model can be produced therefrom, e.g. on a CAD basis. For this purpose the air vehicle can e.g. fly through the interior of a measurement object, e.g. an aircraft, wherein e.g. the inner walls and technical equipment in the interior can be recorded and measured using the scanning device, and a flight path can be continuously automatically adapted such that a movement of the air vehicle takes place to areas that have not yet been measured. In addition, the air vehicle can fly past any obstructions on the basis of said measurements and thus provide the measurement of even complex interiors or objects. Following the complete automatic measurement of the measurement environment, the air vehicle can return to its starting point, land there and make the collected data available.

According to the invention, alternatively or additionally a position and/or a target profile of the object surface can be predefined, in particular specified by a digital model, in particular a CAD model, in particular wherein based on the predefined object surface respective target surface coordinates are compared with the respective 3D coordinates and in particular wherein the referencing arrangement is referenced to the object surface by referencing predefined reference points. In addition, the air vehicle can be moved along a flight path, wherein the flight path can be determined, especially automatically, depending on the surface position and the surface profile.

By specifying a target surface, controlling the air vehicle along the surface can take place based thereon, wherein furthermore a defined distance is maintained between the surface and the air vehicle and a flight path can be flown at said distance.

According to the invention, the flight path and/or a flight speed can be optimized with respect to a scanning travel, a scanning time, a scanning accuracy, a stability of motion of the air vehicle, air vehicle position and orientation determination and/or collision avoidance, in particular wherein a distance to an object, in particular to an obstruction, can be determined.

Furthermore, the scanning strips can thereby be at least partly overlapped depending on the flight path, whereby the scanning accuracy, the scanning travel and the scanning time can be adjusted and/or the movement and orientation of the air vehicle and/or the measuring orientation can be determined and/or adjusted using analysis of an overlap area of the scanning strips, in particular by image processing.

The optimization or adaptation of the flight path can be carried out and/or run automatically depending on the measurement requirements. For example, the flight path can be automatically specified such that the movement of the air vehicle describes a flight curve that is essentially free of tight curve radii and thus enables substantially homogeneous movement of the air vehicle. This especially enables sudden deceleration or acceleration maneuvers to be prevented or inhibited and as a result a reduction in measuring time and an increase in measurement accuracy to be achieved. Obstructions, such as e.g. movable machine parts, in a flight path can also be taken into account and an automatic adaptation can be carried out. In addition, visual contact can be maintained between the air vehicle and an apparatus that interacts with the device for improving the control characteristics by path adaptation.

Moreover, the scanning accuracy can be controlled by selection of the overlap ratio of scanning strips arising during scanning displacement, e.g. an overlap of between 5% and 50% of a strip width. In addition, this can have effects on the scanning speed and scanning time, wherein an increase in the accuracy by greater overlapping can result in an increase of the measuring time. Also the speed and time can behave oppositely here, i.e. for an increase of scanning speed the required scanning time is decreased. With the described overlap, furthermore the orientation and movement of the air vehicle can take place constantly "on-the-fly". For this purpose the overlapping areas can be analyzed using image processing, wherein e.g. coincident patterns are thereby sought in two adjacent overlapping strips and orientation or position referencing can take place based thereon.

In addition, according to the invention positioning signals, in particular signals provided by pseudo satellites and/or GNSS signals, can be received within the framework of the method, in particular wherein the GNSS signals are represented by GPS, GLONASS or Galileo signals, and the outer measuring position can be determined from the received positioning signals, and/or determining the outer measuring position can take place using a reflected measurement beam, especially reflected at the air vehicle.

For referencing, by means of which the transfer of the measurement coordinates from an inner to an outer coordinate system can be completed, signals for relative or absolute position determination of the air vehicle can be provided and received at the air vehicle. The measurement coordinates recorded by scanning can thus be combined with a respective external position and/or time information and from said data combination the position relative to an object to be measured and/or a relative geodetically accurate position of the measured points can be derived. Moreover, for referencing a measuring beam, e.g. a laser beam, is reflected at the air vehicle, in particular at a reflection unit provided for this purpose, and from the reflected beam a position determination of the air vehicle and hence referencing can take place. The measuring beam can furthermore be continuously or continually oriented to the flight direction and referencing can take place constantly.

According to the invention, determining the measuring orientation can take place in the pitch, roll and yaw directions, in particular whereby determination can take place using an internal sensor unit associated with the air vehicle, in particular using an inclination sensor, magnetometer, acceleration sensor, turn rate sensor and/or speed sensor. Alternatively or additionally, determining the measuring orientation can take place with the combination of a marker associated with the air vehicle giving the measuring orientation, especially light emitting diodes, and a recording, in particular using a camera, of the marker for determining the measuring orientation from a position and arrangement of the marker.

Determining the six degrees of freedom—three translational and three rotational degrees of freedom—of the air vehicle can furthermore take place by determining the orientation of the device. For this purpose sensors associated with the air vehicle, i.e. internal sensors, can be used. For example, an IMU (Inertial Measurement Unit) usually three acceleration sensors, three turn rate sensors—and a triaxial magnetometer can be integrated in the air vehicle, with which the exact orientation of the air vehicle relative to the gravitational field and in azimuth can take place continuously. The orientation can thus be precisely determined independently of a line of sight of the air vehicle to a recording unit and taken into account for controlling the air vehicle. If such a line of sight exists, e.g. to a camera, then markers provided on the air vehicle can be recorded by the camera and their position and orientation on a recorded image can be analyzed, in particular by image processing. From this the orientation of the air vehicle can also be determined relative to the camera, with knowledge of the position of the camera in up to three axes relative to a coordinate system.

In particular, according to the invention the measuring orientation can be oriented in parallel, in particular automatically, to the vertical and/or defined relative to the air vehicle orientation, in particular by a gimbal suspension and/or by orientation means for defined orientation of the measuring orientation, in particular wherein pivoting can take place in two, especially in three, axes. Alternatively or additionally, information and/or control commands, in particular object data, can be entered into the air vehicle and/or information, in particular the generated scatter plot, can be output, especially on a display.

During measurement or scanning of objects, a constant parallel orientation of the scanning orientation or the measuring orientation to the vertical direction can be achieved, being implemented by means of a gimbal suspension. For example, such a device can be used for the measurement of two-dimensional and planar surfaces. Using orientation means, by means of which the measuring orientation can be deflected and pivoted in a targeted manner relative to the air vehicle, the scanning direction can be adapted and scanning can thus be facilitated, e.g. for measurement object positions that are difficult to access. Hereby orientation of the scanning and its change relative to the air vehicle can also be recorded and taken into account in determining measurement point coordinates or 3D coordinates.

In particular, control commands for controlling the air vehicle can be input into the air vehicle and/or transmitted to the air vehicle by a remote controller provided for the air vehicle. The transmission can thereby take place by means of a cable between the air vehicle and the referencing arrangement and/or the remote controller, wherein in addition the supply of power to the air vehicle can take place by means of the cable. E.g. a rotational speed of rotors on the air vehicle or the orientation of the rotors can be controlled in this way and the air vehicle can thus be moved in a targeted manner. Furthermore, measurement object information can be input, enabling automatic control of the air vehicle to be assisted and/or to be carried out. Using a display on the air vehicle and/or on the remote controller, in particular during a scanning process, e.g. information can be provided to a user. Thereby e.g. the measured points can be displayed and the progress of the measurement can be tracked.

The invention further provides an automotive, unmanned, controllable air vehicle, in particular a drone, in particular wherein the air vehicle can be oriented and moved while hovering, for use in a measuring system according to the invention. Thereby control data for controlling the air vehicle relative to an outer object coordinate system can be received and/or the control data for controlling the air vehicle can be derived by a processing unit from receivable referencing information to determine a flying orientation and a flying position of the air vehicle, in particular wherein the flying orientation can be determined by an orientation determination unit associated with the air vehicle. The air vehicle carries an optical scanning device based on the triangulation principle for, especially point by point, optical scanning of measurement points of an object surface and for determining inner measurement point coordinates in an inner scanning coordinate system. In addition, the processing unit is configured such that the inner measurement point coordinates can be referenced in the outer object coordinate system, and determining 3D coordinates of the measurement points in the outer object coordinate system can be carried out from the inner measurement point coordinates and from the referencing of the inner measurement point coordinates, so that the inner measurement point coordinates are present as 3D coordinates in the outer object coordinate system, in particular as a scatter plot. In addition, the control data for controlling the air vehicle are configured such that the air vehicle, taking into account respective current inner measurement point coordinates determined using the scanning device and/or taking into account an object surface predefined by a digital model, is automatically moved along a flight path defined by the digital model while being controlled relative to the object surface and while maintaining a predefined range of measuring distances, in particular a measuring distance.

Within the framework of the invention, the control data of the air vehicle according to the invention can further be configured such that the air vehicle can be moved and oriented while being automatically controlled relative to the object surface, depending on the measuring position, which can especially be continuously determined, and the measuring orientation and/or a measuring distance to the object surface that can be determined using the scanning device. In addition hereby, according to the invention the scanning device can comprise an optical scanning apparatus, wherein scanning strips can be generated during movement of the air vehicle, and/or a measuring system using image sequences to determine the measurement point coordinates, in particular wherein the scanning device comprises a line scanner, a strip projection scanner and/or a camera. Moreover, the orientation determination unit can comprise a sensor unit, in particular an inclination sensor, a magnetometer, an acceleration sensor, a turn rate sensor and/or a speed sensor and/or the air vehicle can comprise a distance measurement sensor, in particular a radar, for distance measurement to an object.

In particular, the air vehicle according to the invention can comprise a gimbal suspension and/or orientation means for the defined orientation of the scanning device, in particular automatic parallel orientation to the vertical direction, in particular wherein the scanning device can be pivoted in two, especially in three, axes. Furthermore, the air vehicle according to the invention can comprise an input unit, in particular a keyboard, a touch-sensitive display and a data interface for the input of information and/or control commands, in particular of object data, and/or an output unit, in particular a display, for the output of information, in particular the generated scatter plot, and/or a remote controller for controlling the air vehicle, in particular wherein the remote controller comprises a display for displaying information and/or the generated scatter plot.

The air vehicle can be characterized in that it can enable a measurement or scanning of an object to be carried out while automatically controlled. For this purpose the device can be oriented and moved along an object surface e.g. using rotors and the orientation of the rotors. A measuring distance of the air vehicle to the object surface can be continuously taken into account for control, wherein said distance can be determined by a scanner carried by the air vehicle, which can simultaneously carry out the surface measurement. The control data for controlling the flight can furthermore contain position and orientation information of the air vehicle and of the measurement object, and based on this adaptive control of the means that is moving the air vehicle can be effected. The scanner can thus be continuously displaced or moved relative to the object surface, in particular essentially perpendicularly to a scanning direction, and the surface can be recorded by the scanner. Scanning can thereby take place point by point, i.e. the surface can be recorded by the scanner with a certain point resolution, in particular with a resolution of up to 100 measurement points per millimeter, and/or a time resolution, in particular by repeated measurement of a measurement point in a defined time interval.

For this purpose e.g. the air vehicle can be controlled such that a part of the object surface, in particular of a scanning strip, is repeatedly overflown and measured. By referencing the current position and orientation of the air vehicle, the points measured and coordinates determined in this way are transferred into a higher level coordinate system and the object is thus recorded at least partly, especially fully.

In particular a scanner, e.g. a line scanner, that is implemented using triangulation point measuring can be used as the scanning device for such an air vehicle.

Such systems can record the surface line by line and can scan areas as a result of the system's own movements. Hereby the orientation of the scanning unit relative to an object to be measured can be adjusted and the measuring conditions can be adapted. Orientation means can be provided on an air vehicle for this purpose, using which orientation of the scanning unit can be achieved. For determining the orientation of the air vehicle relative to the object, which is a prerequisite for targeted scanner alignment, other sensors, e.g. an IMU, can be provided on the air vehicle.

According to the invention, an unmanned, controllable, automotive air vehicle can be used to carry an optical scanning device based on the triangulation principle for a measuring system for determining 3D coordinates, in particular a plurality of 3D coordinates, of measurement points of an object surface, in particular of an industrial product, in an outer object coordinate system.

The invention further provides a computer program product, which is stored on a machine-readable medium, or a computer data signal, embodied by an electromagnetic wave, with program code for carrying out a method according to the invention, in particular if the program is implemented in an electronic data processing unit.

The computer program product or computer data signal can be designed such that control instructions are provided therein, in particular in the form of algorithms, with which a method according to the invention for determining 3D coordinates of object surfaces can be carried out with an automotive, unmanned, controllable air vehicle.

BRIEF DESCRIPTION OF THE DRAWINGS

The method according to the invention and the device according to the invention are described in detail below using specific exemplary embodiments schematically illustrated in the figures purely by way of example, wherein further advantages of the invention are also discussed. In the figures.

DETAILED DESCRIPTION

Figure 1:
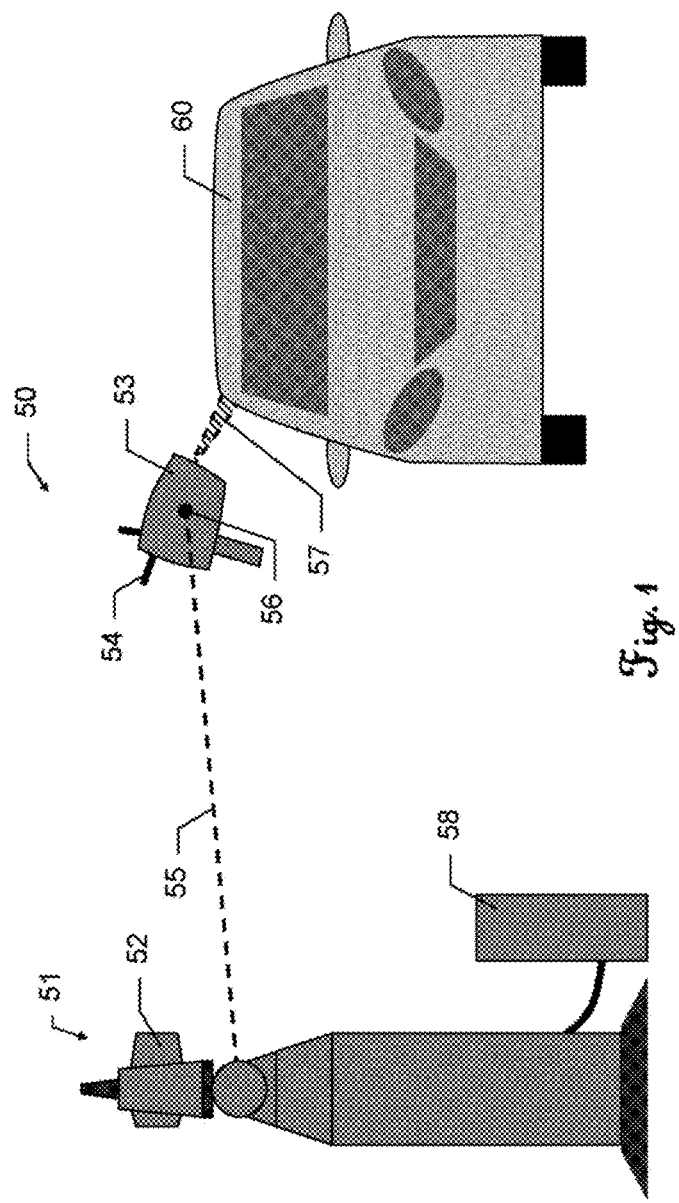
FIG. 1 shows a measuring system according to the prior art.

FIG. 1 shows a measuring system 50 for determining 3D coordinates of an object 60 according to the prior art. The measuring system 50 comprises here a laser tracker 51 with a camera 52 and a mobile scanning unit 53. Markers 54 are further attached to the scanning unit 53, which are recorded by the camera 52 and from whose position and arrangement an orientation of the scanning unit 53 can be determined using an image processing process. In addition, a measuring beam 55 is emitted by the laser tracker 51 and a reflector 56 at the scanning unit 53 is targeted with the beam 55. This enables the position of the scanning unit 53 to be determined relative to the object 60 and relative to the laser tracker 51. In addition, a scanning beam 57 is emitted at the scanner 53, with which the object surface is scanned and local measurement coordinates of the respective position of the surface can be determined. By means of said arrangement, the measurement points on the object 60 thus measured can be referenced in an object coordinate system using the laser tracker 51 and global 3D coordinates of the object 60 can be generated. An evaluation unit 58 is provided for merging the measurement coordinates and the determined current position and orientation of the scanning unit 53, in particular taking into account the known relative position and orientation of the laser tracker 53 to the object 60. Such measuring systems 50 are e.g. used in industrial production when measuring e.g. aircraft or automobiles and can enable quality control of work pieces during production.

Figure 2:
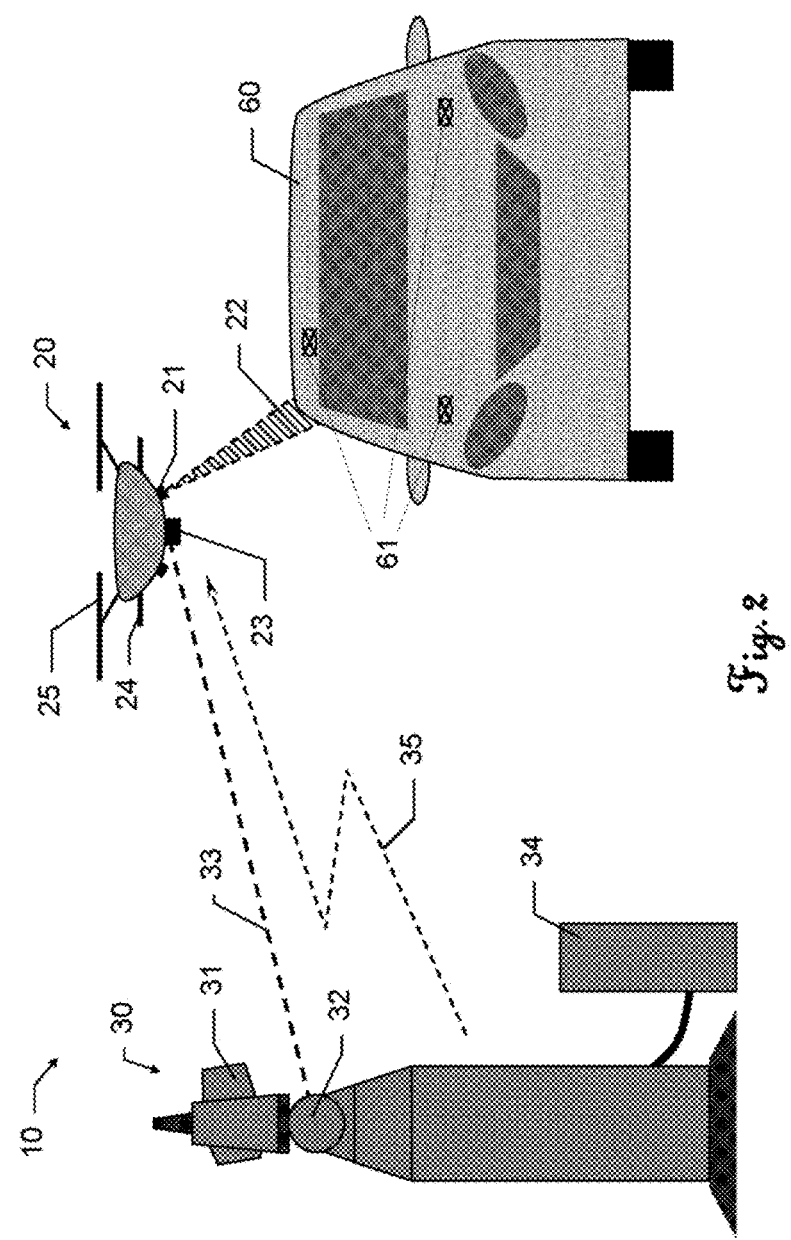
FIG. 2 shows a measuring system according to the invention with an air vehicle and a measuring station for determining the position and orientation of the air vehicle.

In FIG. 2 an embodiment of a measuring system 10 according to the invention is shown. A referencing arrangement embodied by a laser tracker 30 comprises here a recording unit 31, e.g. a video camera, a targeting unit 32 for emission of a measurement beam 33 and an evaluation unit 34. Furthermore, signals 35 can be transmitted to an air vehicle 20. The air vehicle carries a scanning device 21, embodied by a scanner, which emits radiation 22 for scanning towards the object 60 to be measured. In addition a reflector 23 for reflecting a measurement beam 35 emitted by the laser tracker 30 and markers 24, in particular light emitting diodes, are disposed on the air vehicle 20 in a defined position and arrangement. Moreover, the air vehicle 20 comprises at least two, in particular four, rotors 25 (shown in a perspective view), which enable flying movement of the air vehicle 20.

For measurement of the object 60 reference points 61, whose positions on the object 60 are known from CAD data, can be targeted and thus the laser tracker 30 can be calibrated in an object coordinate system. The air vehicle 20 can be moved along the object 60 according to the object surface, wherein the scanner scans measurement points on the object surface using the scanning radiation 22 during the movement. Thereby local measurement point coordinates of the respective surface points can be determined at the scanner.

For recording or measurement of the global surface profile, referencing of the local coordinates in the object coordinate system can now take place. For this purpose, on the one hand the orientation of the air vehicle 20 is determined by recording the markers 24 with the recording unit 31 and evaluating an image generated thereby with the markers 24, e.g. using image processing. Exact orientation determination can take place here using the defined arrangement of the markers on the air vehicle 20 and their position in the image. In addition, on the other hand the position of the air vehicle 20 is determined by targeting the reflector 23 with the measurement beam 33 emitted by the targeting unit 32 of the laser tracker 30. The beam is reflected and recorded by the laser tracker 30 and e.g. an accurate position of the air vehicle 20 relative to the laser tracker 30 is determined from the transition time of a measuring laser pulse and a determinable orientation of the targeting unit 32. with said information the 3D object coordinates, in particular using the evaluation unit 34, can thus be derived and represented as a scatter plot and transferred into a CAD model. Thereby any deviation from the determined coordinates of target coordinates present in the CAD data can be determined simultaneously and e.g. graphically shown on a display in color. Moreover, the air vehicle can be controlled using the signals 35 sent from the laser tracker 30 to the air vehicle, wherein a distance, a position and an orientation of the air vehicle 30 relative to the object 60 can be taken into account for control purposes.

Prior to a measurement with the measuring system 10, a user can define an area of the object 60 to be measured, e.g. the roof of a vehicle, using suitable software based on a CAD model. The spatial relationship of the CAD model to the laser tracker 30 can then be determined by calibration of at least three defined reference points 61 on the vehicle, which are specified as coordinates in the CAD model.

Following selection of the object part an optimal flight path can be calculated. Thereby an optimal distance of the scanner 21 of e.g. 40 cm can also be taken into account, such as an overlap region of scanning strips arising from the scanning of e.g. 20%.

Once the measuring process is started by the user, the current position and orientation of the air vehicle 20 can be recorded by the laser tracker 30 and transmitted to the evaluation unit 34. Recorded values can be compared with target values from the calculated flight path and signals 35 can be derived therefrom, which can be transmitted by radio to the air vehicle 20. Thus the position and orientation of the air vehicle 20 can be continuously corrected and adapted to the determined flight path.

Once the air vehicle 20 has reached the object 60 to be recorded, the scanner 21 can start scanning the surface points. The measurement point coordinates can likewise be transmitted by radio to the evaluation unit 34, where they can be processed together with the recorded position and orientation of the air vehicle 20 and stored.

Figure 3:
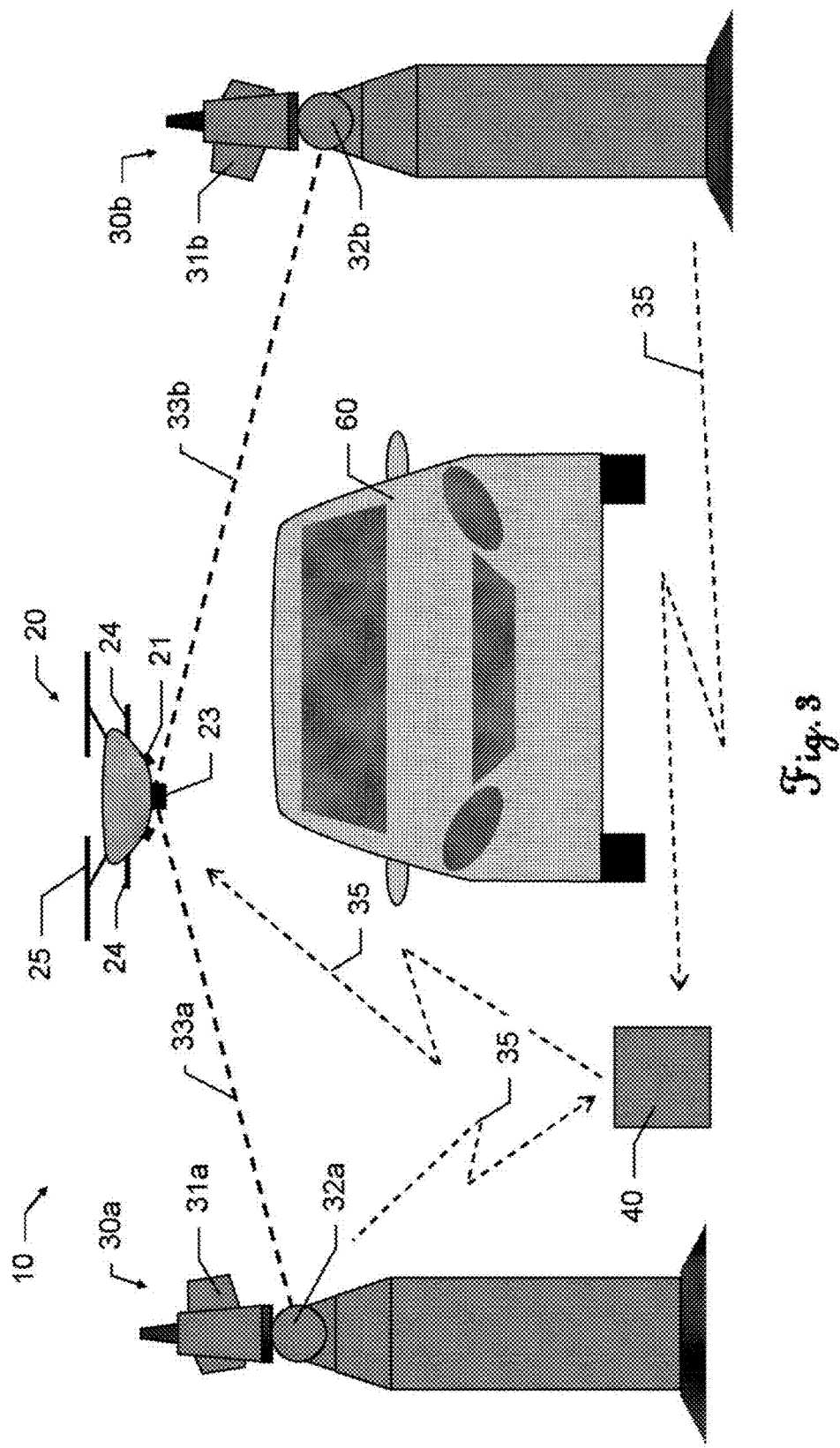
FIG. 3 shows another embodiment of a measuring system according to the invention with two laser trackers and an air vehicle.

FIG. 3 shows another embodiment of a measuring system according to the invention. For referencing, i.e. for determining the six degrees of freedom, i.e. of position and orientation, of the air vehicle 20, two laser trackers 30*a*, 30*b*, each with a camera 31*a*,31*b* and a targeting unit 32*a*,32*b* emitting a measuring beam 33*a*,33*b*, are provided in said embodiment. At the air vehicle 20 in turn a means of interacting with the referencing arrangement or the two laser trackers 30*a*,30*b* is provided, wherein the markers 24 give the orientation and the reflector 23 gives a position. The scanning of the object 60 takes place using the scanner 21. Furthermore, a control unit 40 is provided, enabling control of the air vehicle 20 to take place. For this purpose the control unit 40 can receive signals 35 from the laser trackers 30*a*,30*b*, which can contain a respective current position and orientation of the air vehicle, and can send signals 35 that can be received by the air vehicle 20. The transmitted signals 35 can thereby represent control data that have been generated from referencing information, i.e. from the position and orientation of the scanner 21, and that enable control of the air vehicle 20 along the object 60 using knowledge of the object surface.

Furthermore, the control unit 40 can carry out control of the air vehicle 20 depending on the available CAD data, e.g. a digital surface model of the object 60, such that the air vehicle 20 is moved along a defined path, e.g. essentially parallel to the surface profile, and in doing so the distance to the object surface that can be determined by the scanner 21 can also be taken into account.

Furthermore, with this embodiment the control of the air vehicle 20 can be designed to be redundant. If there is e.g. a sight restriction between one of the laser trackers 30*a*,30*b* and the air vehicle 20, then the position and orientation determination can continue to take place using the second tracker 30*a*,30*b* and the air vehicle 20 can be controlled. For this purpose the tracking or measurement of the air vehicle 20—once a sight restriction is detected, i.e. once the trackers 30*a*,30*b* can no longer detect the markers 24 and/or the reflector 23 on the air vehicle 20—is transferred from one to the other laser tracker 30*a*,30*b* and thereby the operation of the measuring system 10 is guaranteed even in the event of interruption of the line of sight.

Figure 4:
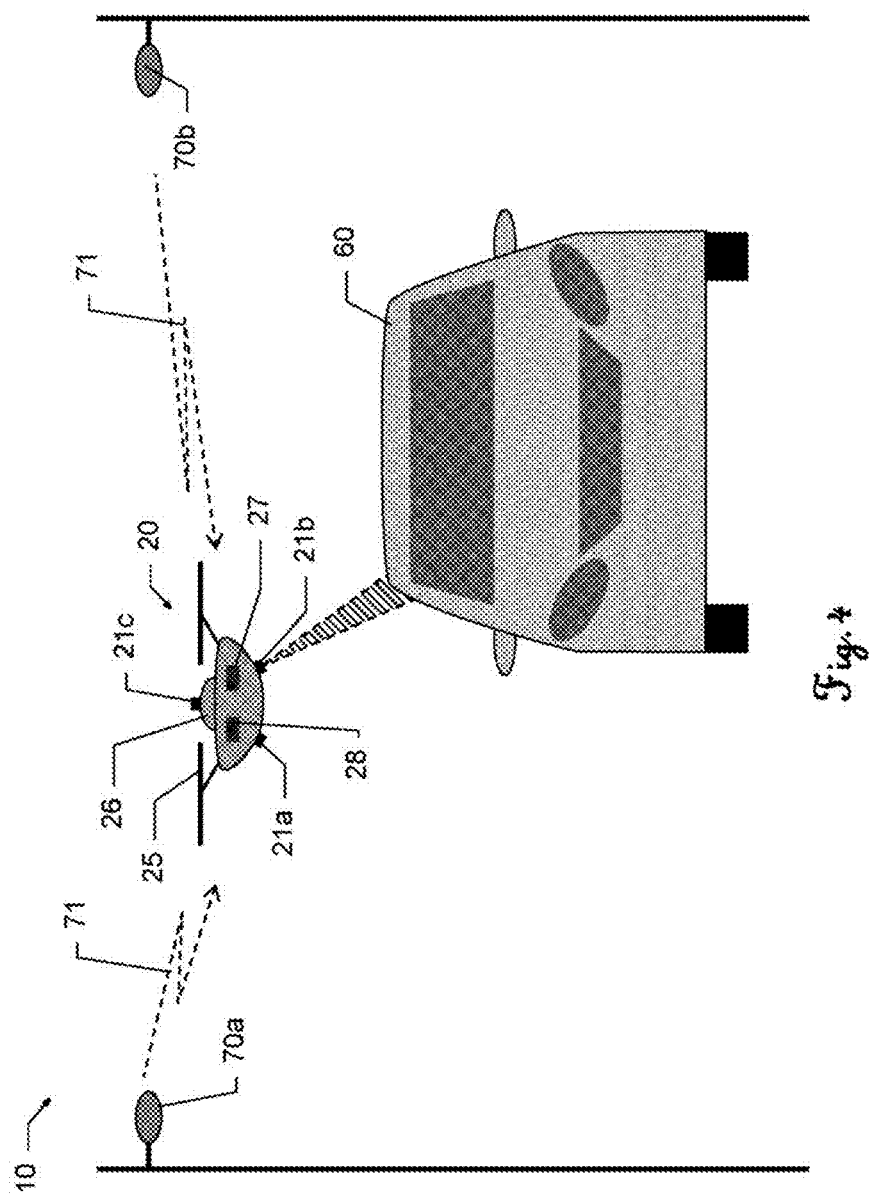
FIG. 4 shows another embodiment of a measuring system according to the invention with pseudo satellites and an air vehicle.

FIG. 4 shows another embodiment of the measuring system 10 according to the invention with an indoor positioning system designed as a referencing arrangement, e.g. for measurement in a production hall, for the air vehicle 20 with pseudo satellites 70*a*,70*b* distributed in space, so-called "pseudolites", wherein the two pseudo satellites 70*a*,70*b* are shown here by way of example, but other "pseudolites" can be provided for referencing. For example, the position of the air vehicle 20 can be uniquely determined from the signals of four such pseudo satellites. In particular, the reception of signals from three pseudo satellites can be sufficient for exact position determination if the signals have a common time base. The air vehicle 20 or the drone also comprises three (inclined up or down) oriented scanning devices 21*a*, 21*b*,21*c*, e.g. triangulation scanners, and a receiver unit 26, which enables position determination using a signal 71 transmitted by the pseudo satellites 70*a*,70*b*. The signals 71 can thereby represent position information using which—essentially analogously to a GNSS system—a relative position determination is possible when receiving a plurality of signals 71. In addition, a sensor unit 27 consisting of an Inertial Measurement Unit (IMU)—consisting of three acceleration sensors and three turn rate sensors—and a triaxial magnetometer can be integrated in the air vehicle 20.

Using said sensor unit 27, the position and the orientation of the air vehicle 20 can be determined in relation to a higher level object coordinate system and thus referencing of a local coordinate system of the respective scanner 21*a*,21*b*, 21*c* with the object coordinate system is carried out. In addition, a processing or computing unit 28 can be provided in the air vehicle 20.

A user can define the area of the object 60 to be measured using a CAD model on an office computer. According to the object coordinates and the criteria to be optimized, a flight path can thus be calculated, which can be transmitted, e.g. by means of a cable connection or by radio, to the computing unit 28 of the air vehicle 20 and stored there.

Once the process is started by the user, the current position and orientation can be determined by the receiver unit 26 and the sensor unit 27 and transmitted to the computing unit 28. The recorded position and orientation values can be compared with the target values of a calculated flight path and control signals for the rotors 25 of the air vehicle 20 can be derived therefrom. By means of this the position of the air vehicle 20 can be adapted to the flight path.

On achieving a target distance or a target area for the surface measurement, the scanner 21*b* facing the object 60 can begin determining the coordinates of the surface points. These can be placed in a memory together with the referencing information, i.e. the recorded values of the position and orientation of the air vehicle 20. After successfully carrying out the measurement and/or during the measurement, the measurement values or measurement coordinates can be transmitted by the air vehicle 20 via a cable connection or using radio to a computer and/or an evaluation unit. There a transformation of the local coordinates to the respective coordinates can be carried out in a CAD system depending on the reference information and a comparison of the current state with the target state of the object 60 can be carried out.

Figure 5:
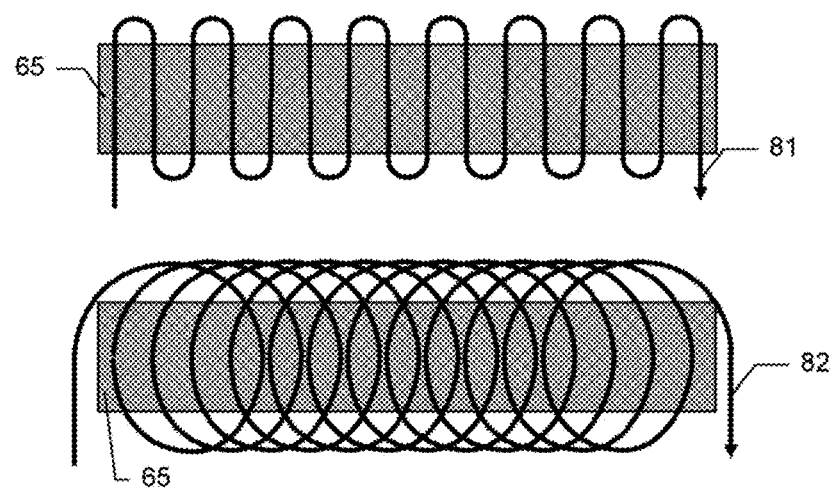
FIG. 5 shows two flight paths for an air vehicle according to the invention.

FIG. 5 shows two optimized flight paths 81,82 along which the air vehicle 20 can be moved for measurement of an object surface 65. Whereas with the flight path 81*a* possible short flight path for the air vehicle 20 should be achieved in order for the surface 65 to be fully measured and hence a very short measuring time should be achieved, with path 82 a path is defined with which tight curve radii can be avoided. At the same time higher measuring accuracy can be achieved by flight path 82, because during the course of path 82 at least partial areas of the surface 65 can be overflown repeatedly and can thus be measured repeatedly. Both flight paths 81,82 can be determined based on a surface model of an object to be measured and optimized depending on the measurement requirements. Moreover, as described above, a correction or adaptation of the respective flight path 81,82 can be carried out, especially continuously, depending on a determined measuring distance between the air vehicle 20 and the object surface 65 and/or depending on obstructions detected during the flying movement.

What is claimed is:

1. A measuring system for determining 3D coordinates of measurement points of an object surface in an outer object coordinate system, the measuring system comprising:
    an optical scanning device based on a triangulation principle for point by point optical measurement of the measurement points of the object surface and for determining inner measurement point coordinates in an inner scanning coordinate system;
    a referencing arrangement for generating referencing information for referencing the inner measurement point coordinates in the outer object coordinate system;
    an evaluation unit for determining 3D coordinates of the measurement points in the outer object coordinate system depending on the inner measurement point coordinates and referencing information, so that the inner measurement point coordinates are present as 3D coordinates in the outer object coordinate system;
    an unmanned, controllable, automotive air vehicle carrying the optical scanning device; and
    a control unit configured such that the air vehicle is moved relative to the object surface under automatic control while maintaining a predefined range of measuring distances, wherein a measuring distance takes into account at least one of:
        respective current inner measurement point coordinates determined with the optical scanning device; and
        a digital model object surface predefined by a digital model along a flight path defined by the digital model;
    wherein at least one of
        the control unit is configured to move and orient the air vehicle while being automatically controlled relative to the object surface depending on the measuring distance to the object surface that is determined with the optical scanning device;
        a position and a target profile of the object surface is pre-determinable by a digital CAD model and, based on a predefined object surface, respective target surface coordinates are comparable with the respective 3D coordinates and the referencing arrangement is referenced to the object surface by referencing predefined reference points; and
        the optical scanning device comprises at least one of:
            an optical scanning apparatus generating scanning strips during a movement of the air vehicle,
            the measuring system configured to use image sequences for determining at least one of the inner measurement point coordinates in the inner scanning coordinate system and the inner measurement point coordinates in the outer scanning coordinate system,
            a line scanner,
            a strip projection scanner, and
            a camera.

2. The measuring system as claimed in claim 1, wherein the 3D coordinates of the measurement points comprise a plurality of 3D coordinates of measurement points of the object surface and the object surface is a surface of an industrial product.

3. The measuring system as claimed in claim 1, wherein the inner measurement point coordinates comprise 3D coordinates in the outer object coordinate system as a scatter plot.

4. The measuring system as claimed in claim 1, wherein the unmanned, controllable, automotive air vehicle carrying the optical scanning device is configured to be oriented and moved while hovering.

5. The measuring system as claimed in claim 1, wherein at least one of:
    the control unit is configured to move and orient the air vehicle while being automatically controlled relative to the object surface depending on at least one of
        a measuring position and a measuring orientation of the optical scanning device are continuously being determined with the referencing arrangement;
        the measuring distance to the object surface that is determined with the optical scanning device; and
        at least one of the position, and the target profile of the object surface is defined and the scanning strips are generated during a movement of the air vehicle.

6. The measuring system as claimed in claim 1, wherein:
    the flight path is automatically determined depending on a surface position, a target surface profile, and the flight path;
    a flight speed is optimized with regard to at least one of a scanning travel, a scanning time, a scanning accuracy, a stability of motion of the air vehicle, determination of a position and orientation of the air vehicle, and collision avoidance; and
    a distance to an obstruction is determined with a distance measurement sensor, the scanning strips being at least partly overlapped depending on the flight path, wherein at least one of:
        the scanning accuracy, the scanning travel, and the scanning time is adjusted; and
        a movement and the orientation of at least one of the air vehicle and the optical scanning device is determined with an analysis of an overlap area of the scanning strips by image processing.

7. The measuring system as claimed in claim 1, wherein the referencing arrangement comprises at least one of:
    a position determining arrangement, which is designed such that an outer measuring position of the optical scanning device is determined in relation to the object coordinate system; and
    an orientation determination arrangement, which is designed such that a measuring orientation of the optical scanning device is determined in relation to either or both the inner object coordinate system and the outer object coordinate system.

8. The measuring system as claimed in claim 1, wherein:
    at least one of the optical scanning device and the air vehicle comprise a reflector;
    the referencing arrangement comprises at least one of a geodetic measuring device, a total station, and a laser tracker, with at least:
        a radiation source for generating an optical measurement beam for distance measurement;
        a base defining a vertical axis;
        a beam deflection unit for emitting the measurement beam and for receiving at least part of the measurement beam reflected at the reflector, wherein for orientation of an optical target axis the beam deflection unit is configured to pivot by a motor relative to the base about the vertical axis and an inclination axis essentially orthogonal to the vertical axis;

angle measuring functionality for high precision recording of an orientation of a target axis; and evaluation means for data storage and controlling an orientation of the beam deflection unit, and wherein the measurement beam is configured to orient to the reflector continuously so that a measuring position of at least one of the optical scanning device and an air vehicle position is determined.

9. The measuring system as claimed in claim 8, wherein at least one of:

the measuring system is configured to send a signal to at least one of the optical scanning device and to the air vehicle, the signal comprising at least one of:

position information, wherein the position information is convertible into control data for controlling the air vehicle in a first processing unit associated with the air vehicle; and the control data for controlling the air vehicle, wherein the control data is determinable from the position information with a second processing unit associated with the referencing arrangement.

10. The measuring system as claimed in claim 9, wherein:

at least one of the optical scanning device and the air vehicle comprises a GNSS antenna, configured to receive GNSS signals and determine the measuring position of the optical scanning device from the GNSS signals;

the referencing arrangement comprises a pseudo satellite module for transmitting positioning signals; and a receiver unit of at least one of the optical scanning device and of the air vehicle is designed to receive positioning signals and to determine at least one of the measuring position and a measuring orientation of the scanner from the received positioning signals.

11. The measuring system as claimed in claim 1, wherein the referencing arrangement comprises at least one of:

a sensor unit associated with at least one of the optical scanning device and the air vehicle for determining at least one of a measuring orientation and a measuring position of at least one of the line scanner, an inclination sensor, a magnetometer, an acceleration sensor, a turn rate sensor and a speed sensor;

the referencing arrangement comprises a distance image acquisition unit for recording an image of the air vehicle, wherein at least one of a contour and image point-dependent distance data to the air vehicle is derivable from at least one of the image and the measuring orientation and the measuring position is determinable therefrom; and the air vehicle comprises an environment recording unit including the camera for recording a position marker disposed in at least one of a defined pattern and a pseudo-random pattern, wherein determining of at least one of the measuring orientation and the measuring position is carried out with a position and orientation of a marker recorded on a second image.

12. The measuring system as claimed in claim 1, wherein:

the optical scanning device or the air vehicle comprises a marker giving the measuring at least one of a defined pattern, a pseudo random pattern, a barcode, and a light emitting diode, and the referencing arrangement comprises a recording unit including the camera for recording the marker and for determining a measuring orientation of the optical scanning device from a position and arrangement of the marker.

13. The measuring system as claimed in claim 1, wherein at least one of:

the referencing arrangement comprises a distance image acquisition unit for recording an image of the air vehicle, wherein a contour and/or image point-dependent distance data to the air vehicle is derived from the image and a measuring orientation and/or a measuring position is determinable therefrom; and the air vehicle comprises an environment recording unit including the camera for recording a position marker disposed in a defined pattern or a pseudo-random pattern, wherein a determination of the measuring orientation or the measuring position are executable with a position and orientation of a marker recorded on the image.

14. The measuring system as claimed in claim 1, wherein the optical scanning device is pivotable in two or three axes.

15. The measuring system as claimed in claim 1, wherein the automotive, unmanned, controllable air vehicle is configured to:

receive control data for controlling the air vehicle relative to the outer object coordinate system; and derive the control data with a processing unit for controlling the air vehicle from receivable referencing information for determining a flying orientation and a flying position of the air vehicle;

wherein:

the air vehicle carries the optical scanning device based on the triangulation principle for optical scanning of measurement points of the object surface and for determining inner measurement point coordinates in the inner scanning coordinate system;

the processing unit is configured to reference the inner measurement point coordinates in the outer object coordinate system;

the processing unit is configured to determine 3D coordinates of the measurement points in the outer object coordinate system from the inner measurement point coordinates and from referencing of the inner measurement point coordinates, so that the inner measurement point coordinates are present as 3D coordinates in the outer object coordinate system as a scatter plot; and the air vehicle is moved while being automatically controlled relative to the object surface while maintaining the predefined range of measuring distances.

16. The measuring system as claimed in claim 15, wherein the air vehicle is moved while being automatically controlled relative to the object surface while maintaining the predefined range of measuring distances and the measuring distance taking into account at least one of:

respective current inner measurement point coordinates determined with the scanning device; and the object surface predefined by the digital model along the flight path defined by the digital model.

17. The measuring system as claimed in claim 15, wherein at least one of:

the air vehicle is moved and/or oriented depending on at least one of a measuring position, a measuring orientation, and the measuring distance to the object surface as determined by the optical scanning device while being automatically controlled relative to the object surface;

the optical scanning device comprises the optical scanning apparatus, wherein the scanning strips are generated during movement of the air vehicle;

the measuring system with an image sequence for determining the measurement point coordinates;

an orientation determination unit that comprises a sensor unit or the air vehicle comprises a distance measurement sensor for distance measurement to an object;

the air vehicle for defined orientation of the optical scanning device comprises at least one of a gimbal suspension and orientation means for orientation of the optical scanning device, wherein the optical scanning device is pivotable in two or three axes;

the air vehicle comprises at least one of an input unit and an output unit wherein the input unit is configured for input of at least one of information and control commands and the output unit is configured to output information; and the air vehicle comprises a remote controller for controlling an air vehicle plot.

18. The measuring system as claimed in claim 7, wherein at least one of:

the measuring position and the measuring orientation of the optical scanning device are determined with a known positional relationship and orientation relationship of the air vehicle to the optical scanning device; and an air vehicle position and an air vehicle orientation is determined by the referencing arrangement.

19. The measuring system as claimed in claim 8, wherein:

the referencing arrangement comprises at least one GNSS satellite represented by GPS, GLONASS or Galileo, wherein the at least one GNSS satellite provides one or more GNSS signals, and the optical scanning device or the air vehicle comprise a receiver unit to receive GNNS signals and the measuring position of the optical scanning device is determined from the one or more GNSS signals.

* * * * *